US007702626B2

(12) United States Patent
Dehn et al.

(10) Patent No.: US 7,702,626 B2
(45) Date of Patent: Apr. 20, 2010

(54) SIMPLIFIED VALIDITY RANGE SELECTION

(75) Inventors: René Dehn, Sinsheim (DE); Martin Kaiser, Speyer (DE)

(73) Assignee: SAP AG, Walldorf (DE)

( * ) Notice: Subject to any disclaimer, the term of this patent is extended or adjusted under 35 U.S.C. 154(b) by 805 days.

(21) Appl. No.: 11/021,267

(22) Filed: Dec. 22, 2004

(65) Prior Publication Data
US 2006/0136481 A1 Jun. 22, 2006

(51) Int. Cl.
G06F 7/00 (2006.01)
G06F 17/30 (2006.01)
(52) U.S. Cl. .................................. 707/5; 707/3; 707/4
(58) Field of Classification Search ................ 715/501, 715/501.1, 710, 854; 705/1, 14, 5, 8, 3, 27; 707/203, 4, 3, 2, 5, 104.1, 100, 101, 102, 707/201; 368/28, 29
See application file for complete search history.

(56) References Cited

U.S. PATENT DOCUMENTS

| 5,615,109 | A  | * | 3/1997  | Eder ............................... 705/8 |
| 5,710,901 | A  | * | 1/1998  | Stodghill et al. ............. 715/710 |
| 5,719,826 | A  | * | 2/1998  | Lips ............................. 368/29 |
| 5,793,716 | A  | * | 8/1998  | Lips ............................. 368/28 |
| 5,797,117 | A  | * | 8/1998  | Gregovich ................... 707/101 |
| 5,933,837 | A  | * | 8/1999  | Kung .......................... 707/201 |
| 5,999,924 | A  | * | 12/1999 | Bair et al. ...................... 707/4 |
| 6,108,640 | A  | * | 8/2000  | Slotznick ..................... 705/26 |
| 6,185,556 | B1 | * | 2/2001  | Snodgrass et al. .............. 707/3 |
| 6,262,735 | B1 | * | 7/2001  | Etelapera .................... 715/854 |
| 6,442,543 | B1 | * | 8/2002  | Snodgrass et al. .............. 707/3 |
| 6,983,286 | B1 | * | 1/2006  | Sinha et al. .................. 707/102 |
| 7,003,504 | B1 | * | 2/2006  | Angus et al. .................... 707/1 |
| 7,203,660 | B1 | * | 4/2007  | Majeed ......................... 705/27 |
| 7,346,526 | B2 | * | 3/2008  | Daughtrey et al. ............. 705/5 |
| 2002/0122355 | A1 | * | 9/2002  | Williams ..................... 368/21 |
| 2002/0165724 | A1 | * | 11/2002 | Blankesteijn ................... 705/1 |
| 2002/0174124 | A1 | * | 11/2002 | Haas et al. ................... 707/100 |
| 2004/0078251 | A1 | * | 4/2004  | DeMarcken .................... 705/5 |
| 2004/0145777 | A1 | * | 7/2004  | Satomi et al. .............. 358/1.15 |
| 2005/0086087 | A1 | * | 4/2005  | Razza et al. .................... 705/5 |
| 2005/0101323 | A1 | * | 5/2005  | De Beer .................. 455/435.2 |

(Continued)

OTHER PUBLICATIONS

"Adding Transaction Time to SQL/Temporal"; ISO International Organization for Standarization May 10, 1996; authors: Richard T. Snodgrass, Michale H. Bohlen, Christian S. Jensen and Adreas Steiner.*

*Primary Examiner*—John E Breene
*Assistant Examiner*—Giovanna Colan
(74) *Attorney, Agent, or Firm*—Kenyon & Kenyon LLP

(57) ABSTRACT

In one embodiment, the invention is a method. The method includes receiving a validity statement including a range and an identifier from a user interface. The method further includes determining the identifier indicates a validity range statement. The method also includes looking up the range of the validity statement in a validity range table. Additionally, the method includes translating the range of the validity statement into a validity from parameter and a validity to parameter. Moreover, the method includes submitting a database select statement including the validity from parameter and the validity to parameter to a database interface. Furthermore, the method includes receiving a set of records from the database interface responsive to the database select statement. Also, the method includes transmitting the set of records to the user interface.

20 Claims, 12 Drawing Sheets

U.S. PATENT DOCUMENTS

| | | | |
|---|---|---|---|
| 2005/0120062 A1* | 6/2005 | Sinha et al. | 707/203 |
| 2005/0144554 A1* | 6/2005 | Salmon et al. | 715/501.1 |
| 2005/0171975 A1* | 8/2005 | Scholz | 707/104.1 |
| 2006/0053055 A1* | 3/2006 | Baggett et al. | 705/14 |
| 2006/0064313 A1* | 3/2006 | Steinbarth et al. | 705/1 |

* cited by examiner

| Selection on symbolic field VALIDITY | | | | Translation into database fields | | | |
|---|---|---|---|---|---|---|---|
| SIGN | OPTION | LOW | HIGH | SELFIELD | | OPTION | LOW |
| I | = | "TODAY" | - | VALID_FROM | - | <= | System date |
| E | = | "TODAY" | - | VALID_TO | E | >= | System date |
| I | = | "TODAY" | - | VALID_FROM | E | <= | System date |
| E | = | "TODAY" | - | VALID_TO | E | >= | System date |
| I | = | "WEEK" | - | VALID_FROM | - | <= | End of actual week |
| | | | | VALID_TO | - | >= | Begin of actual week |
| E | = | "WEEK" | - | VALID_FROM | E | <= | End of actual week |
| | | | | VALID_TO | E | >= | Begin of actual week |
| I | = | "MONTH" | - | VALID_FROM | - | <= | End of actual month |
| | | | | VALID_TO | - | >= | Begin of actual month |
| E | = | "MONTH" | - | VALID_FROM | E | <= | End of actual month |
| | | | | VALID_TO | E | >= | Begin of actual month |
| I | = | "QUARTER" | - | VALID_FROM | - | <= | End of actual quarter |
| | | | | VALID_TO | - | >= | Begin of actual quarter |
| E | = | "QUARTER" | - | VALID_FROM | E | <= | End of actual quarter |
| | | | | VALID_TO | E | >= | Begin of actual quarter |
| I | = | "YEAR" | - | VALID_FROM | - | <= | End of actual year |
| | | | | VALID_TO | - | >= | Begin of actual year |

FIG. 10A

| E | = | "YEAR" | – | VALID_FROM | E | ≤ | End of actual year |
| | | | | VALID_TO | E | ≥ | Begin of actual year |
| – | Not Between | Date1 | Date2 | VALID_FROM | E | ≥ | Date1 |
| | | | | VALID_TO | E | ≤ | Date2 |
| E | Not Between | Date1 | Date2 | VALID_FROM | – | ≥ | Date1 |
| | | | | VALID_TO | – | ≤ | Date2 |

| | | | | | | |
|---|---|---|---|---|---|---|
| I | Between | Date1 | Date2 | | VALID_FROM | I | ≥ | Date1 |
| E | Between | Date1 | Date2 | | VALID_TO | I | ≤ | Date2 |
| I | = | Date | – | | VALID_FROM | E | ≥ | Date1 |
| E | = | Date | – | | VALID_TO | E | ≤ | Date2 |
| I | ≠ | Date | – | | VALID_FROM | I | ≤ | Date |
| E | ≠ | Date | – | | VALID_TO | I | ≥ | Date |
| I | ≥ | Date | – | | VALID_FROM | E | ≥ | Date |
| E | ≥ | Date | – | | VALID_TO | E | ≥ | Date |
| I | > | Date | – | | VALID_FROM | I | > | Date |
| E | > | Date | – | | VALID_TO | I | > | Date |
| I | ≤ | Date | – | | VALID_FROM | E | ≤ | Date |
| E | ≤ | Date | – | | VALID_TO | E | ≤ | Date |
| I | < | Date | – | | VALID_FROM | I | < | Date |
| E | < | Date | – | | VALID_TO | E | < | Date |

FIG. 11

SIMPLIFIED VALIDITY RANGE SELECTION

CROSS-REFERENCE (none)

BACKGROUND

In searching for information, a date related to that information is often a vital part of a search query. For example, a search may be executed for all transactions on a given date, or within a given range of dates. Similarly, a search may be executed for all information entered on a given date, or within a range of dates. Such searches may be useful for identifying sales of products, meetings with clients, visits by people to a facility, and many other similar forms of data. Another example of such searches for information occurs on the website of the U.S. Patent and Trademark Office, at which, a date or range of dates may be entered for patents or patent applications in the process of searching for such data.

When a user uses software to search for data with a date range, typically the user needs to provide a start and end date for a date range. Where a very specific date range is specified, or a date range unrelated to a calendar is specified, such an interface works well. However, even in such instances, errors in entering dates (such as typographical errors on a keyboard) can be problematic, both in terms of providing erroneous results of searches and in terms of reliance on such erroneous results by users of such data. Users of data need not be the people entering the search criteria, and may not have any contact with the users of a data storage system from which data is obtained. Thus, date range errors can affect many more people than the users of the interface to the data storage system.

It may be expected that most date ranges will correspond to a well-identified portion of a calendar. Quarterly sales information may be based on a three month window. Weekly hospital visit counts may be based on a Sunday to Saturday (or Monday to Sunday, for example) week. Monthly sales call totals may be based on calendar months. All of these exemplify potential types of searches for information, or queries in database operations. However, it can be difficult to enter a proper start and end date for some of these requests. For example, a mistyped begin date may result in a quarter with four (instead of three) months. Similarly, a mistyped end date may result in a Monday to Monday (instead of Sunday) week. Thus, a solution to avoid entering specific dates for a date range may be useful, to ameliorate errors and to ease requirements of user interfaces in software.

SUMMARY

A technique for simplified validity range selection is described and illustrated in various embodiments in this document. In one embodiment, the invention is a method. The method includes receiving a validity statement including a range and an identifier from a user interface. The method further includes determining the identifier indicates a validity range statement. The method also includes looking up the range of the validity statement in a validity range table. Additionally, the method includes translating the range of the validity statement into a validity from parameter and a validity to parameter. Moreover, the method includes submitting a database select statement including the validity from parameter and the validity to parameter to a database interface. Furthermore, the method includes receiving a set of records from the database interface responsive to the database select statement. Also, the method includes transmitting the set of records to the user interface.

In another embodiment, the invention is an apparatus. The apparatus includes a database interface. Moreover, the apparatus includes a user interface. Also, the apparatus includes a validity range interpreter.

In yet another embodiment, the invention is a method. The method includes receiving a validity range. The method also includes translating the validity range into a validity from parameter and a validity to parameter. The method further includes submitting a database select statement including the validity from parameter and the validity to parameter.

It will be appreciated that the present invention is described below using specific examples that are not intended to limit the invention. The systems and methodology may be applied to a broad range of other computer applications. Therefore these and other advantages and aspects of the present invention will become apparent to those skilled in the art upon a reading of the following detailed description and a study of the drawing figures.

BRIEF DESCRIPTION OF THE DRAWINGS

Embodiments of the invention are illustrated in the figures. However, the embodiments and figures are illustrative rather than limiting; they provide examples of the invention. The invention is limited only by the claims.

FIG. 11 illustrates an alternate embodiment of a translation table of validity date ranges and corresponding query parameters.

DETAILED DESCRIPTION

Figure 1:
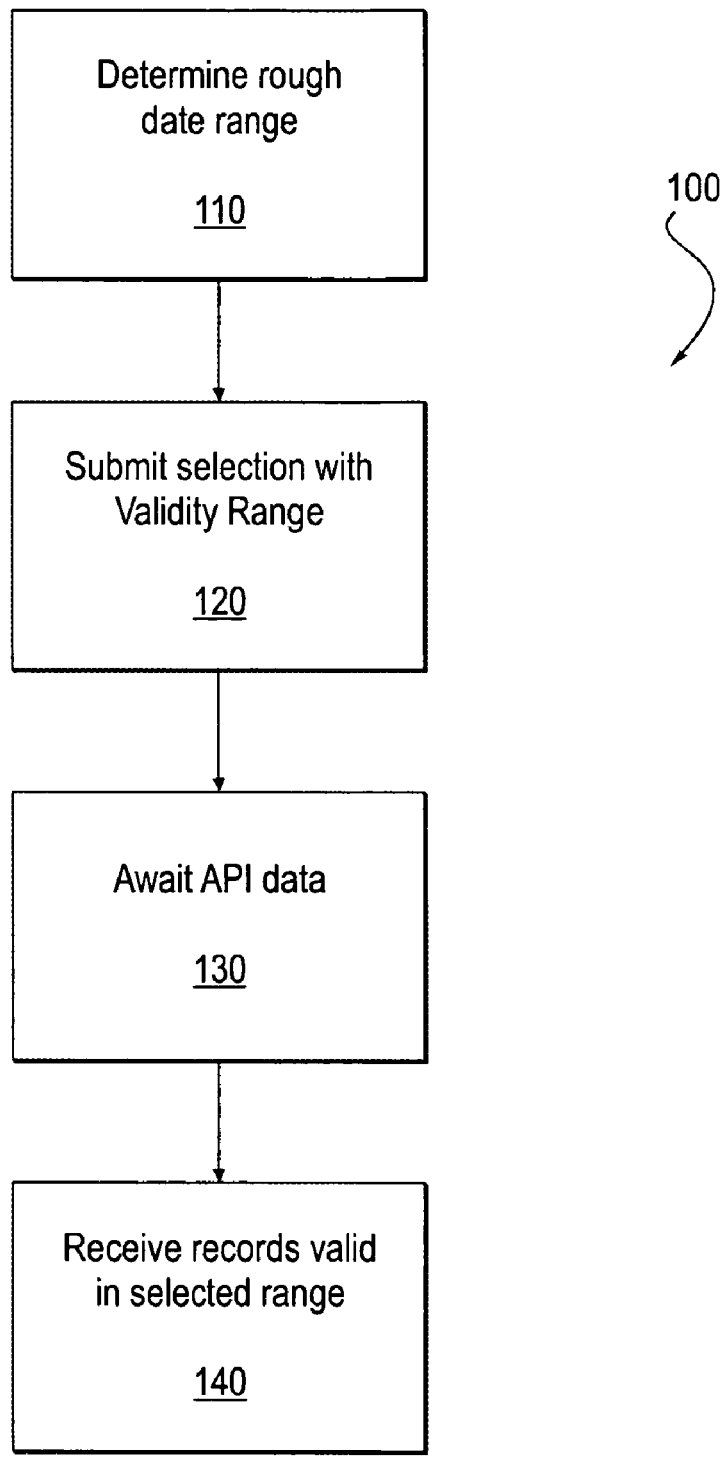
FIG. 1 illustrates an embodiment of a method of requesting data using a simplified validity range.

A technique for simplified validity range selection is described and illustrated in various embodiments. A method and apparatus for simplified validity range selection is provided. Such a method or apparatus, in various embodiments, may be used to select database records or otherwise search for data based on date ranges without requiring a user to enter specific dates. The specific embodiments described in this document represent exemplary instances of the present invention, and are illustrative in nature rather than restrictive in terms of the scope of the present invention. The scope of the invention is defined by the claims.

Embodiments of the invention may be implemented in a variety of ways, as methods, systems, and mixtures of custom and general-purpose components. Generally, simplified validity range selection may be expected to encompass use of a simple VALIDITY parameter selected by a user, which is then interpreted into more complex parameters suitable for use in a select statement or similar query for a database. The database may be expected to return records matching the date criteria, along with any other criteria supplied.

In an embodiment, the invention is a method. The method includes receiving a validity range. The method also includes translating the validity range into a validity from parameter and a validity to parameter. The method further includes submitting a database select statement including the validity from parameter and the validity to parameter.

The method may further include receiving a set of records from the database interface responsive to the database select statement. The method may also include transmitting the set of records to a user interface. Additionally, the method may include querying a user for the validity range. The method may involve various validity ranges, such as a week or a fiscal quarter, for example. Moreover, the method may involve looking up the validity range in a validity range table. Also, receiving the validity range may include receiving a selection from a user of a text representation of a validity range in a user interface.

In another embodiment, the invention is an apparatus. The apparatus includes a database interface. Moreover, the apparatus includes a user interface. Also, the apparatus includes a validity range interpreter.

The apparatus may involve the user interface including a drop-down menu. The apparatus may also involve the validity range interpreter including a lookup table having range identifiers and corresponding date calculations. The apparatus may further involve the user interface including a means for receiving a date selection from a user. The apparatus may also include a processor, a memory, and a bus coupled to the processor and to the memory. The processor is to operate the database interface, the user interface and the validity range interpreter.

In yet another embodiment, the invention is a method. The method includes receiving a validity statement including a range and an identifier from a user interface. The method further includes determining the identifier indicates a validity range statement. The method also includes looking up the range of the validity statement in a validity range table. Additionally, the method includes translating the range of the validity statement into a validity from parameter and a validity to parameter. Moreover, the method includes submitting a database select statement including the validity from parameter and the validity to parameter to a database interface. Furthermore, the method includes receiving a set of records from the database interface responsive to the database select statement. Also, the method includes transmitting the set of records to the user interface.

Also, the methods or apparatuses may be embodiment as a set of instructions, which, when executed by a processor, cause the processor to perform the method or configure the processor and surrounding general-purpose system as an embodiment of the invention.

The method may further include determining whether the validity range is inclusive or exclusive. The method may involve ranges such as a day, a week, a business week, a month, a fiscal quarter, a calendar quarter, a fiscal year and a calendar year, for example. Moreover, the method may involve translation including performing calculations from the validity range table on a current date to determine the validity from parameter and the validity to parameter.

Various embodiments may be used to implement a simplified validity range selection. For example, an embodiment may include both a portion which handles receipt of a validity range selection and another portion which handles translation of a validity range selection into specific dates. FIG. 1 illustrates an embodiment of a method of requesting data using a simplified validity range. The method includes determining a rough date range, submitting that date range, awaiting data from an interface, and receiving records corresponding to the date range. The method may include additional or different modules, and the modules may be reorganized to achieve the same result.

Method 100 and other processes or methods include a set of modules which may be executed in a serial fashion, may be reordered, and may be executed in a parallel fashion, for example. Method 100 begins at module 110 when a rough date range is determined. This determination may be the result of a user selection of a date selection such as a day, week, month, quarter, year, or other calendar-defined date range. The rough date range is submitted to an interface at module 120. The module may send a set of parameters to be used in a query to a database or search for information, including the selected date range to the interface. At module 130, a process of awaiting a result occurs, such as may occur when a system displays a message to a user indicating processing is occurring. At module 140, responsive records or data are received from the interface or a linked module. Such responsive records may be expected to include data which meets the search criteria of module 120, including the rough date range of module 110 as applied.

The rough date range which is mentioned will typically be specified based on a unit of days which is related to human or calendar perceptions. As such, date ranges such as a week, two weeks, a month, a calendar quarter, a fiscal quarter, a half-year, and a year may be exemplary of the ranges selectable by a user. Rather than requiring the user to calculate the start and end points of the date range, the user is allowed to select the range by name. Preferably, the system allows the name to then be passed to an interface, which may then allow for transformation from the name to a numerical range, for example.

Figure 2:
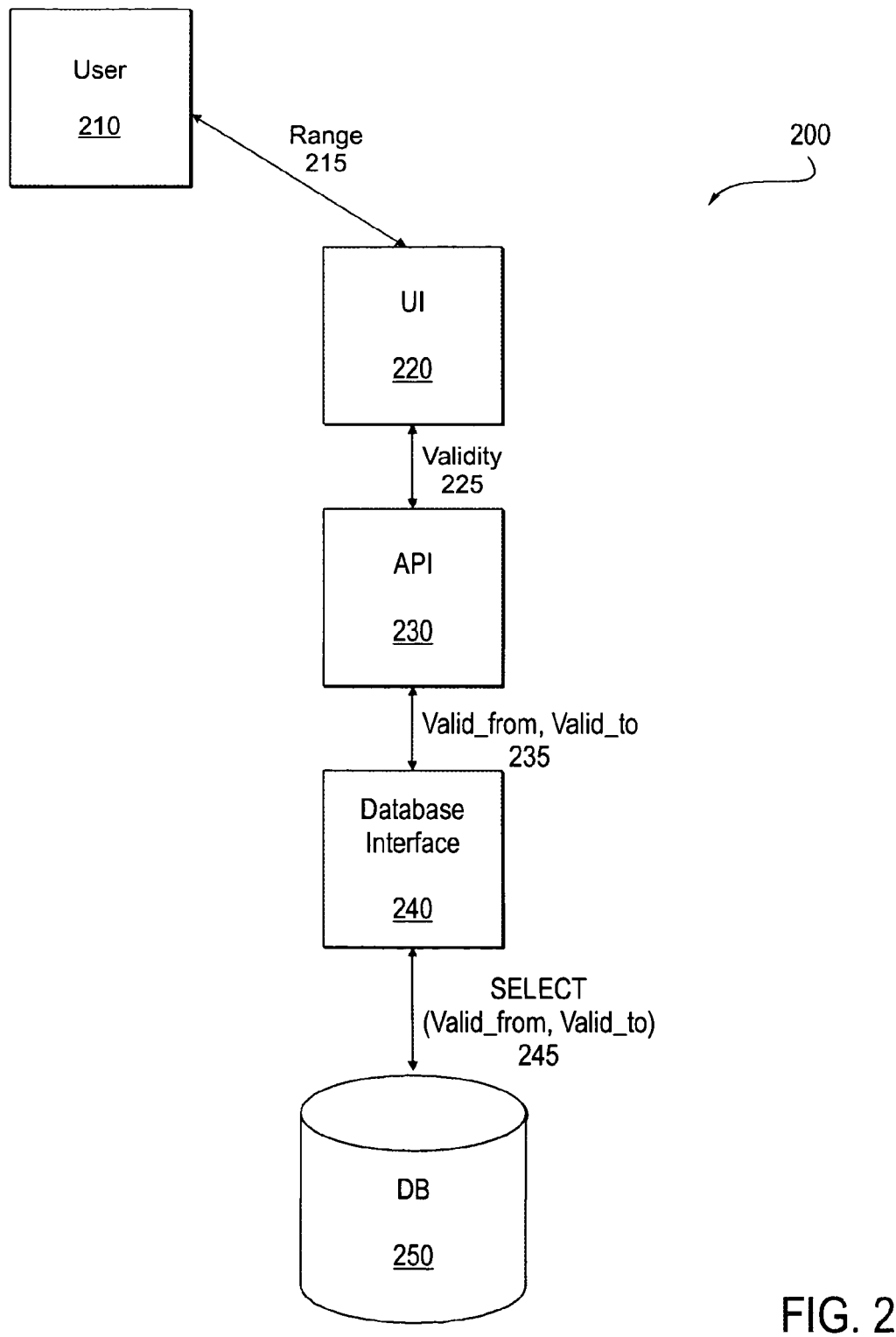
FIG. 2 illustrates an embodiment of a system in which simplified validity ranges may be used.

Various configurations may be used in conjunction with a method such as method 100. FIG. 2 illustrates an embodiment of a system in which simplified validity ranges may be used. System 200 includes a user interface, application interface, and a database interface, which are illustrated as providing a coupling between a user and a database.

System 200 may be used by a user 210. In the process of requesting information (e.g. records) from database 250, user 210 may submit a date range 215. The date range 215 is received by a user interface 220. The date range may be a range such as is mentioned with respect to method 100, namely a week, month, year, etc., for example. User interface 220, having received the date range (such as through a selection for example), transmits a representation (Validity range 225) of that selection to an application interface 230. The validity range 225 is provided to application interface 230 as a representation of the date range without translation to specific date information—the representation communicates a type of range, rather than the dates current for that type of range.

Application interface 230, or a related module, translates the validity range 225 into a valid_from and valid_to form of a date range 235, namely a start and end date for the date range 235. Validity range 225 may also encode such information as exclusive or inclusive use of such dates, resulting in additional information beyond the two dates, or varying translation of the two dates. In some embodiments, date range 235 includes a start and end date, and a flag or set of flags indicating properties such as inclusive or exclusive use of the endpoints of the date range 235 (and this may allow for inclusive use of one endpoint and exclusive use of the other endpoint, for example). In alternate embodiments, date range 235 may only include actual date endpoints, but times encoded in those date endpoints may effectively include or exclude the dates of the endpoints (such as using 12:01 AM for an included begin endpoint and 12:59 PM for an excluded begin endpoint for example).

Date range 235 is passed to database interface 240 or a similar interface for searchable information. Database interface 240 in particular may receive date range 235 as part of a select statement, or as part of a set of parameters to be assembled into a select statement. Database interface 240 may then submit a corresponding SELECT (or similar) statement to database 250, including data encoding date range 235. Database 250 may then return records meeting the requirements of date range 235, and thus validity range 225 and range 215.

Figure 3:
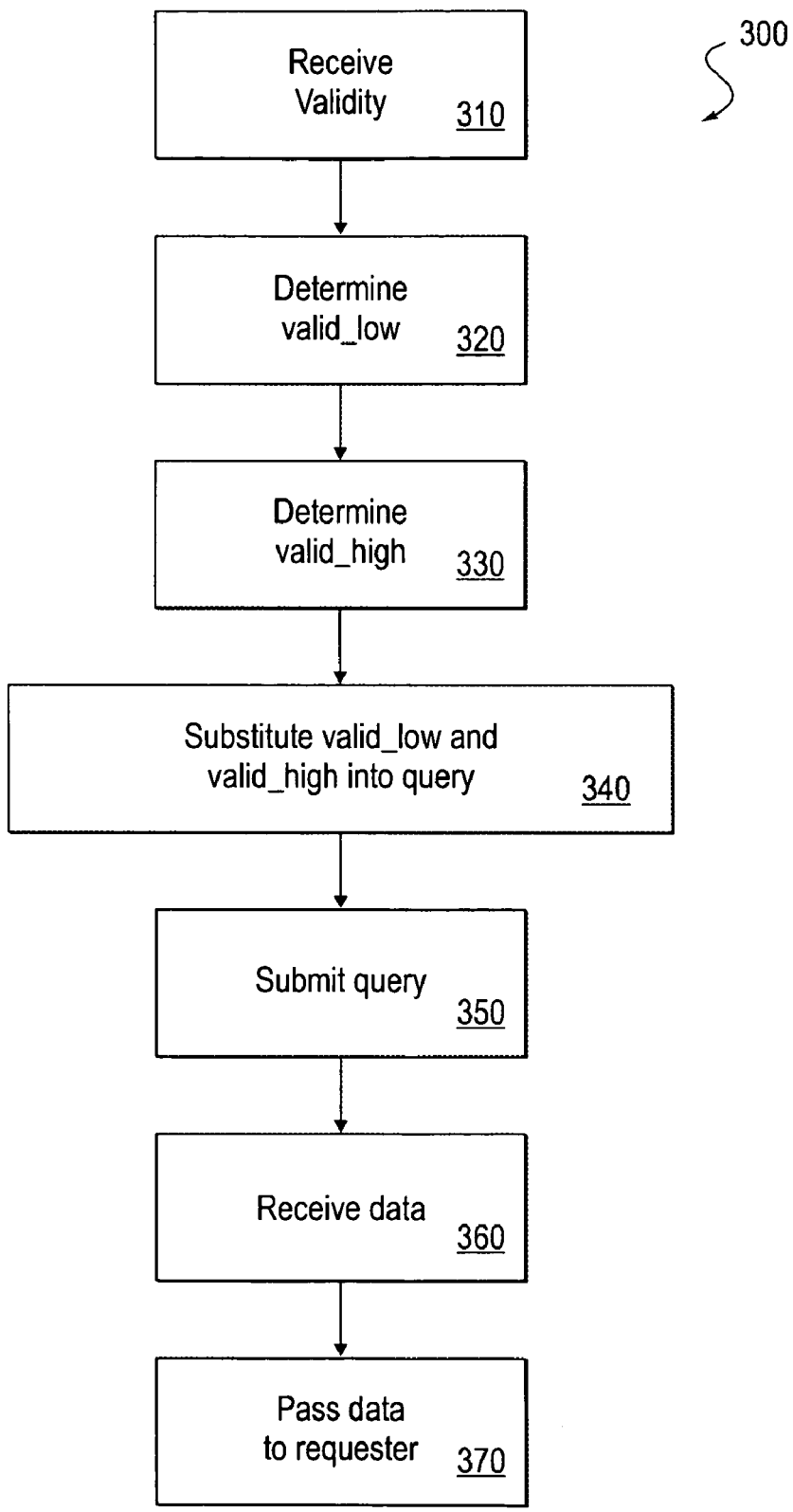
FIG. 3 illustrates an embodiment of a method of using a simplified validity range to request data.

Other methods may be used in conjunction with the embodiment of FIG. 2, and features of one method (such as that of FIG. 1 may be used with features of other methods (such as that of FIG. 3). FIG. 3 illustrates an embodiment of a method of using a simplified validity range to request data. Method 300 includes receiving a validity statement, determining low and high parameters based on the statement, submitting a query based on the low and high parameters, receiving data responsive to the query and passing the responsive data to the requester.

At module 310, method 300 begins with receipt of a validity statement. Such a validity statement or validity range may come in the form of an identifier representing a week, month, quarter, or other time period (generally expressible in days) for which valid records are sought. Thus, a user, for example, need not calculate specific dates and properly enter those dates, but may simply specify a range.

At module 320, a valid_low value or parameter is determined, such as by looking up the validity statement in a table to determine how such a parameter may be determined. Similarly, at module 330, a valid_high value or parameter is determined. For example, the table may include a formula for calculation of a value (where a relative value based on a current date may be useful) or a reference to a function which may calculate the value (where a value based on a calendar position may be useful). A relative value may be one specified by a phrase such as "the previous seven days" for example. A valued based on a calendar position may be specified by a phrase such as "current month" or "previous quarter" for example.

At module 340, the valid_low and valid_high parameters are substituted into a query (such as a select statement for example). Thus, a query may be built up from parameters received from a user interface, and then the valid_low and valid_high parameters may be substituted in to replace the validity statement received at module 310. At module 350, the query or select statement is submitted to a repository or database to determine if any records meet its criteria.

Responsive to the query, data is received at module 360. The data received may be expected to meet the criteria of the query, including meeting the date restriction specified by the valid_low and valid_high parameters. In instances where no data meet the criteria, a return indicating no records were found may be expected. At module 370, the responsive data is passed to a requester or user, such as through a user interface, for example.

Figure 4:
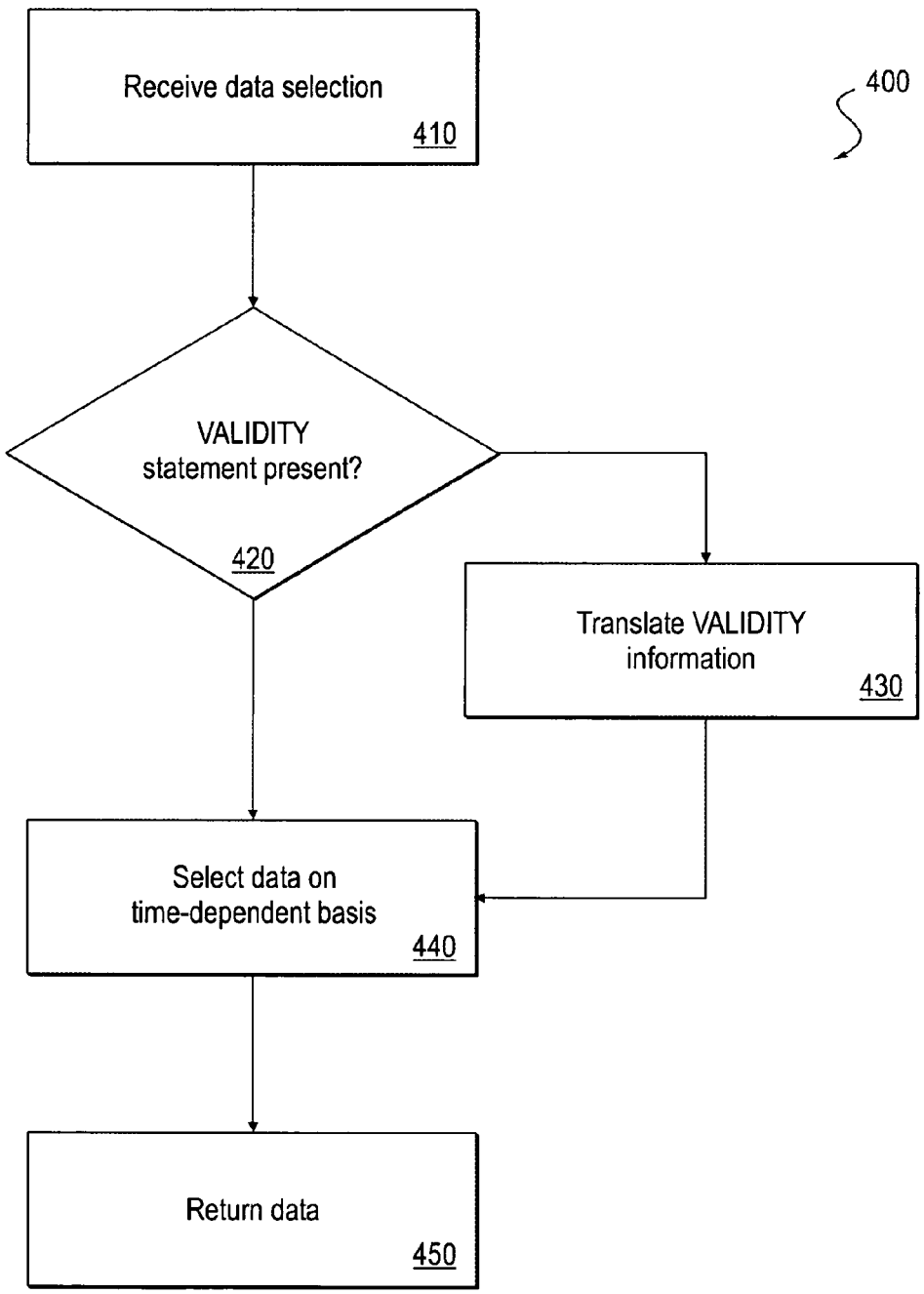
FIG. 4 illustrates an alternate embodiment of requesting data using a simplified validity range.

Similarly, a method such as that of FIG. 3 or FIG. 1 may be understood in a larger context as a subset of a method of selecting records with time dependent data. FIG. 4 illustrates an alternate embodiment of requesting data using a simplified validity range. Method 400 includes receiving a data selection, determining if a validity statement is present, translating the validity statement if present, selecting data on a time-dependent basis, and returning the data.

Method 400 begins with module 410, and receipt of a data selection from a user, for example. The data selection may include a variety of criteria specific to a given database or repository, along with some form of time-dependent factor. At module 420, a determination is made as to whether a VALIDITY statement is present. The VALIDITY statement may be expected to be a statement from the user interface representing a date range in calendar terms rather than in absolute date parameter (e.g. timecode or datecode) terms.

If the VALIDITY statement is present, at module 430, the statement is translated into a date range represented by a from value or parameter and a to value or parameter, which may be used as part of a select statement, for example. Data is then selected (requested) from a database or repository including whatever time-dependent statement is approriate at module 440. Thus, if the VALIDITY statement was present, then the date parameters of module 430 are used. If the VALIDITY statement is not present, then date parameters direct from module 410 are used to determine which records meet the criteria of the select statement. At module 450, responsive data or records are returned, such as to a user interface which may then display the data in various formats.

Figure 5:
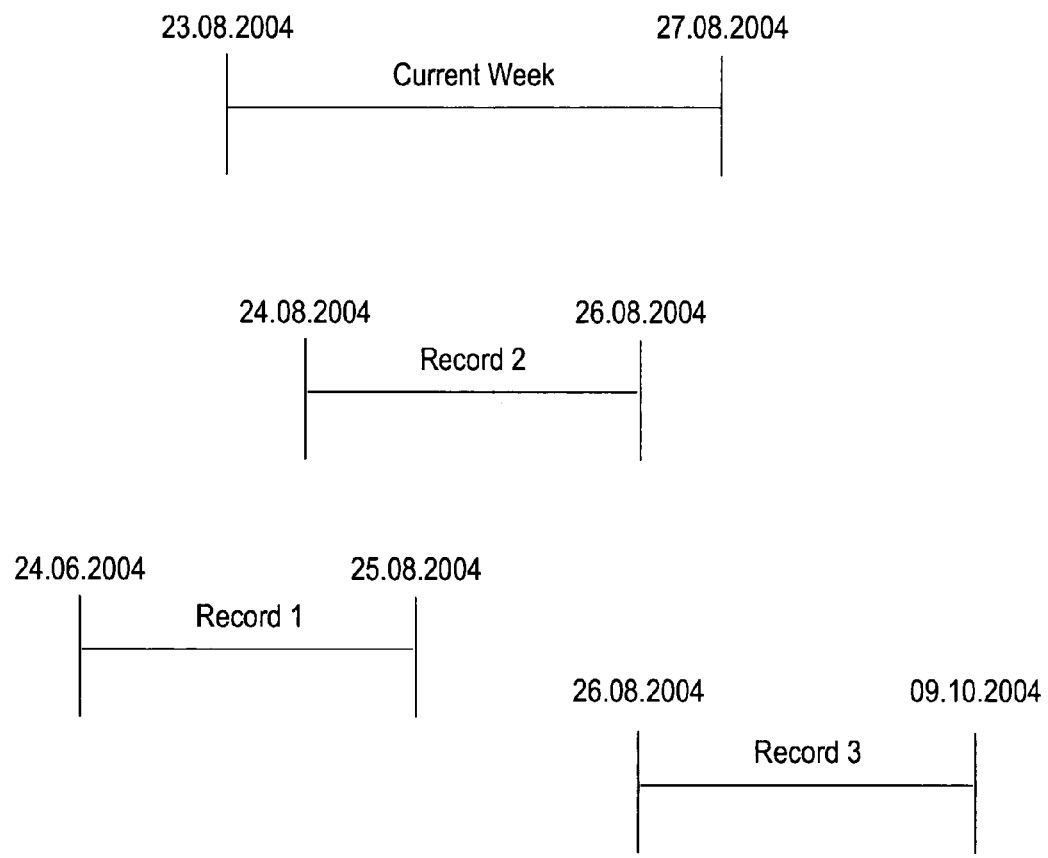
FIG. 5 illustrates a set of records with varying date ranges as compared to a specified date range in one embodiment.

The methods and systems discussed so far may be understood with reference to a set of records. FIG. 5 illustrates a set of records with varying date ranges as compared to a specified date range in one embodiment. A current week and a set of records are illustrated. Thus, a user may, on Aug. 25, 2004, request records valid during a current week. The selection may be by way of a user interface with a drop-down menu or radio buttons, for example. The current week, in this embodiment, refers to a business week or work-week, or Monday through Friday for example. Record 1 is a record valid from Jun. 24, 2004 to Aug. 25, 2004, record 2 is a record valid from Aug. 24, 2004 to Aug. 26, 2004 and record 3 is a record valid from Aug. 26, 2004 to Sep. 10, 2004.

With the validity statement indicating a range of a week is selected, a calculation may be made to determine the from and to date parameters for the range. For example, a function may be used to select a preceding Monday and a succeeding Friday for a given date. In this example, the preceding Monday is Aug. 23, 2004 and the succeeding Friday is Aug. 27, 2004. Thus, a select statement may include those dates for a range of dates in which selected records should be valid. Examining the records, record 1 is determined to be valid within the selected range, record 2 is determined to be valid within the selected range and record 3 is determined to be valid within the selected range. Thus, each of the three records is returned for such a selection. Similarly, if the same request (current week) was made for the date of Aug. 26, 2004, the same result would be received. If a selection of records valid on the day Aug. 25, 2004 was requested, only records 1 and 2 would be returned.

Figure 6:
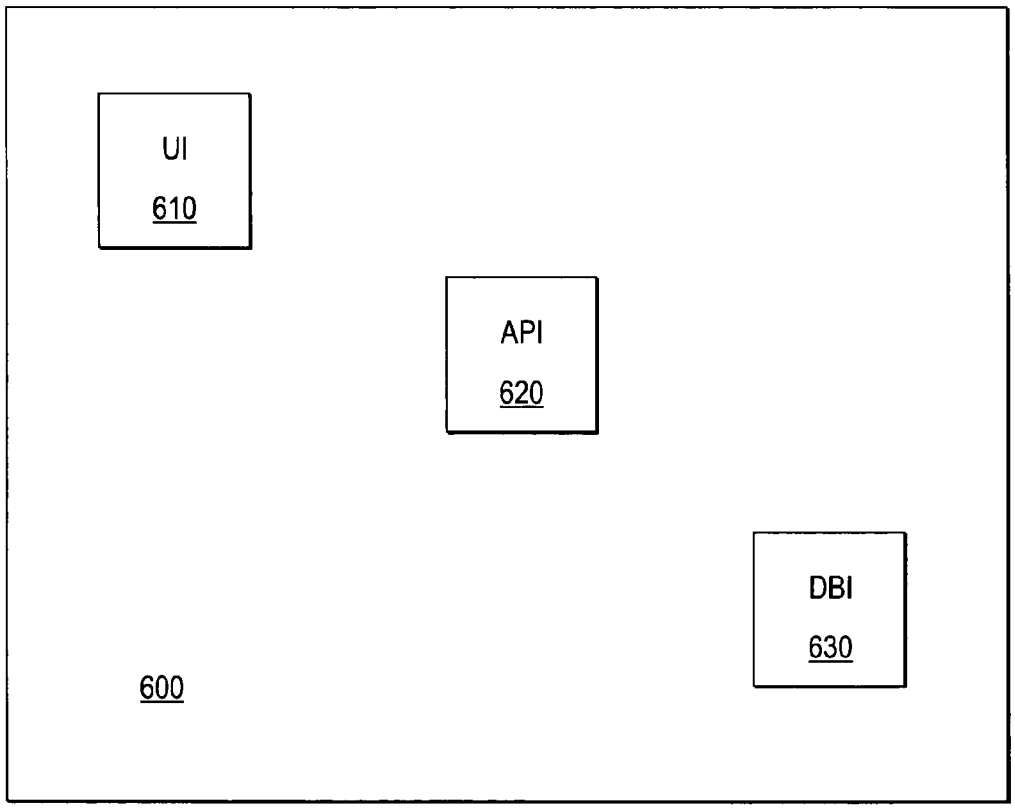
FIG. 6 illustrates an embodiment of a machine-readable medium.

As may be appreciated, the various methods may be embodied as instructions in a machine-readable medium, and systems or apparatuses may operate in conjunction with a machine-readable medium. FIG. 6 illustrates an embodiment of a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals and digital signals). The machine-readable medium typically embodies a program as a set of instructions, which, when executed by a processor, cause the processor to perform a method.

Medium 600 includes a user interface, an application program interface, and a database interface. User interface 610 may be an actual user interface, such as a graphical user interface, or may be a communications interface allowing for communications between a user interface (aside from interface 610) and a separate module such as an application program interface 620. API 620 may be a module which receives data from user interface 610 and prepare requests for database interface 630. Thus, API 620 may be a part of an application, yet need not include modules of an application related to functionality other than date validity range selections. Thus, API 620 may be used to translate a VALIDITY statement from a user interface into a set of valid_from and valid_to parameters for a select statement. Database interface 630 may be expected to receive select statements, or a similarly formatted set of paramters, and submit a request or query to a database (not shown). Database interface 630 may further be expected to receive responsive data from a database, and potentially to format that data into a useful format. Similarly, API 620 may be expected to receive data from database interface 630 and provide that data for use by a user in user interface 610, or for use by a related application program, for example.

Figure 7:
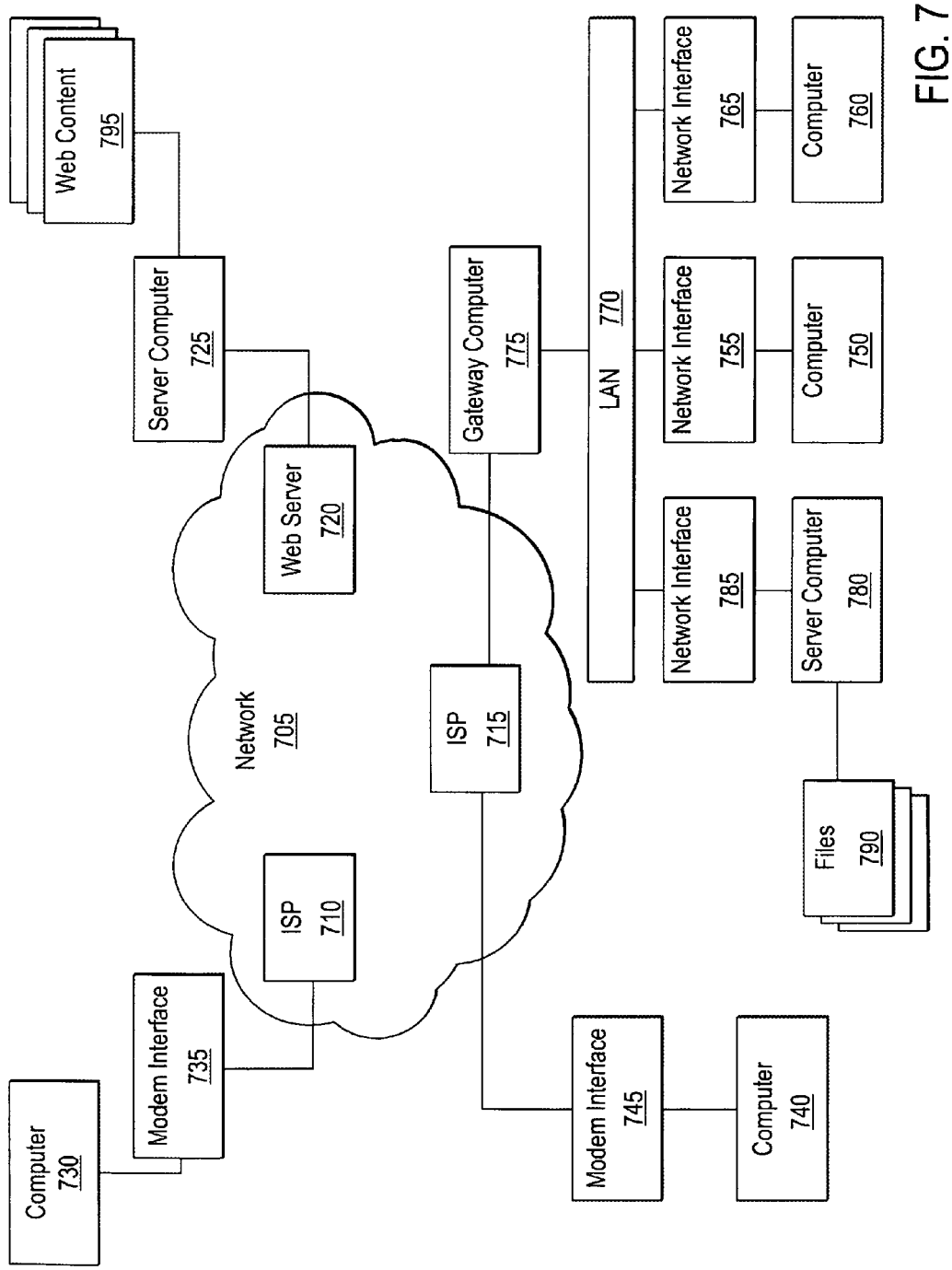
FIG. 7 illustrates an embodiment of a network in which simplified validity ranges may be useful.
Figure 8:
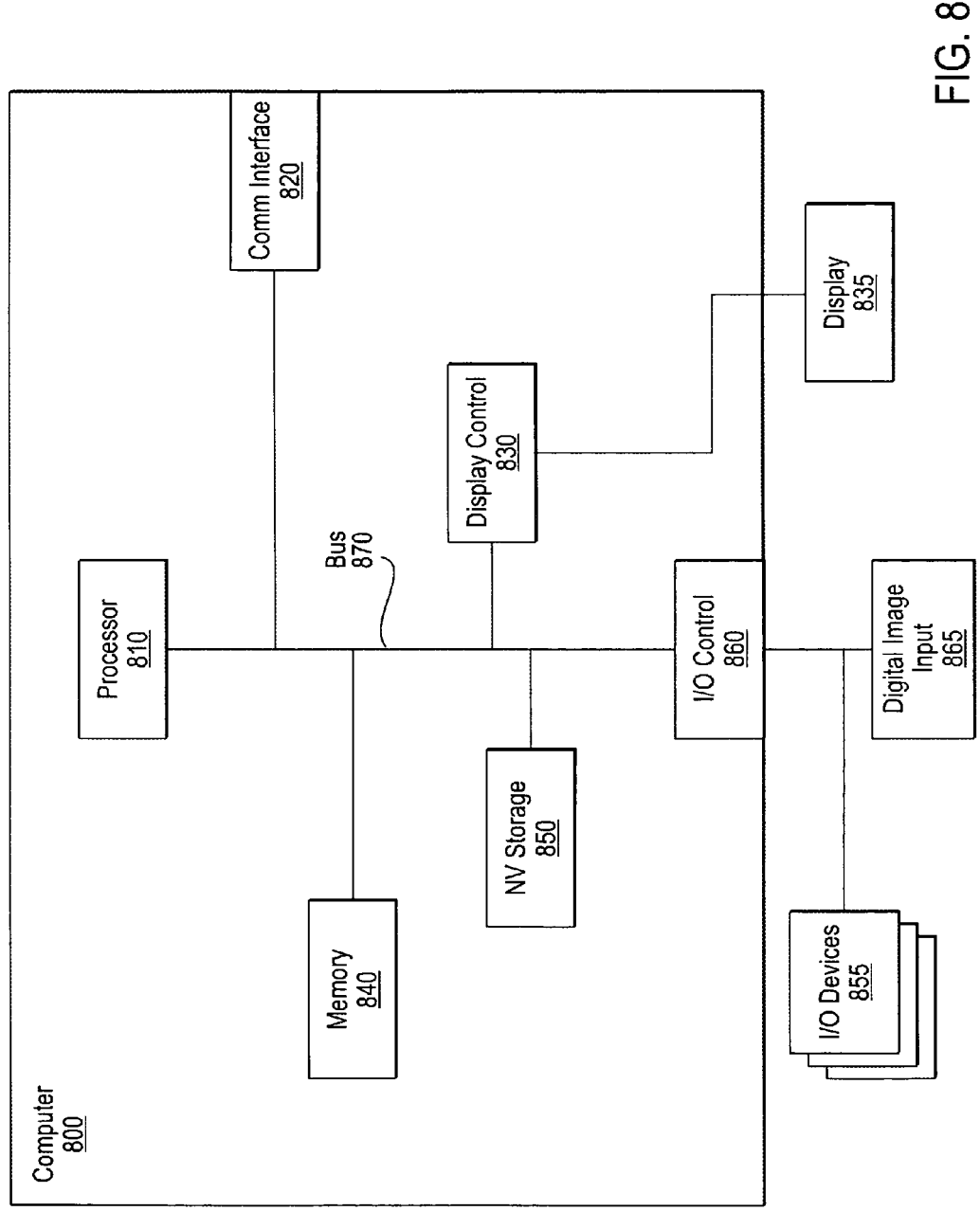
FIG. 8 illustrates an embodiment of a computer which may be used with simplified validity ranges.

The following description of FIGS. 7-8 is intended to provide an overview of computer hardware and other operating components suitable for performing the methods of the invention described above and hereafter, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet. The term "internet" as used herein refers to a network of networks which uses certain protocols, such as the tcp/ip protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 740, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web tv system, or other such computer system.

Similarly, the ISP 715 provides internet connectivity for client systems 740, 750, and 760, although as shown in FIG. 7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a conventional computer system that can be used as a client computer system or a server computer system or as a web server system. Such a computer system can be used to perform many of the functions of an internet service provider, such as ISP 710. The computer system 800 interfaces to external systems through the modem or network interface 820. It will be appreciated that the modem or network interface 820 can be considered to be part of the computer system 800. This interface 820 can be an analog modem, isdn modem, cable modem, token ring interface, satellite transmission interface (e.g. "direct PC"), or other interfaces for coupling a computer system to other computer systems.

The computer system 800 includes a processor 810, which can be a conventional microprocessor such as an Intel pentium microprocessor or Motorola power PC microprocessor. Memory 840 is coupled to the processor 810 by a bus 870. Memory 840 can be dynamic random access memory (dram) and can also include static ram (sram). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an i/o controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the Linux operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9A:
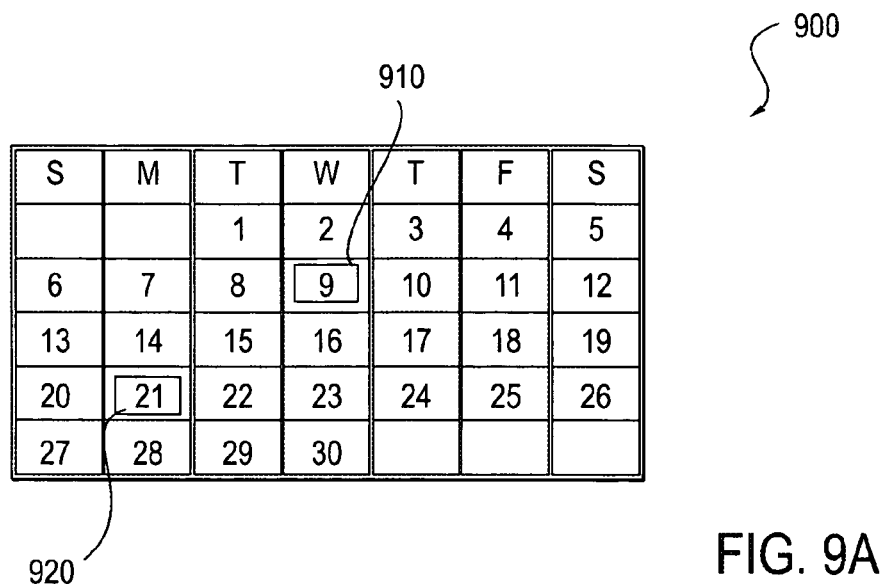
FIG. 9A illustrates an embodiment of a user interface which may be used for selecting a date range.

While various user interfaces may be useful with the methods and systems previously discussed, a examples of such user interfaces may be helpful. FIG. 9A illustrates an embodiment of a user interface which may be used for selecting a date range. For example, a current date may be illustrated in calendar 900, such as by the selected date 910. A set of radio buttons, for example, may be used to select from a variety of types of date ranges, such as a week, month, calendar quarter, fiscal quarter or other range. The radio buttons are not specifically illustrated, but may be understood from user interfaces generally. Thus, a month including current date 910 may be selected, for example, and valid records during that time period may be requested. Alternatively, a different date may be selected—thereby selecting a past or future date for which valid records are desired. For example, date 920 may be selected by a user, along with a date range such as a week, to determine the range in which valid records may exist.

Figure 9B:
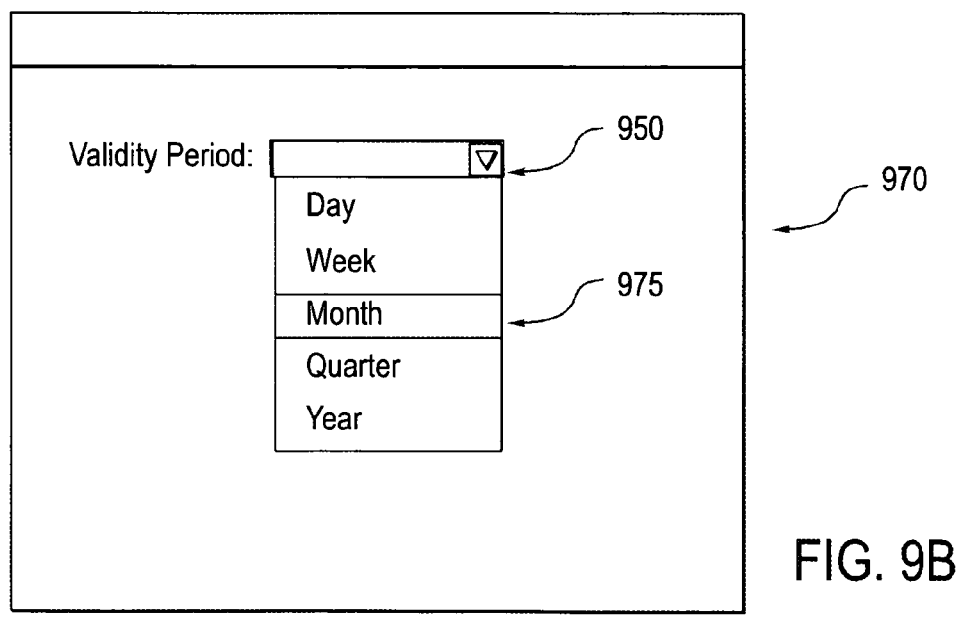
FIG. 9B illustrates an embodiment of a user interface which may be used for selecting a validity date range.

FIG. 9B illustrates an embodiment of a user interface which may be used for selecting a validity date range. In such an interface, the current date is assumed, and selection of the range including the current date is allowed. The user interface component illustrated is a drop-down menu. Menu 970 includes a selection display 950 and a list of options 975. As illustrated, a month is selected from the list of option 975. Upon ratification of the selection (such as by a mouse click for example), the selected option (e.g. Month) will be displayed in selection display 950, without the drop-down list of options 975, thus indicating to a user the range selected. This selection, upon submission by a user, may be used as a VALIDITY statement, and then translated into a from and to parameter based on the current date, for example.

Figure 10:
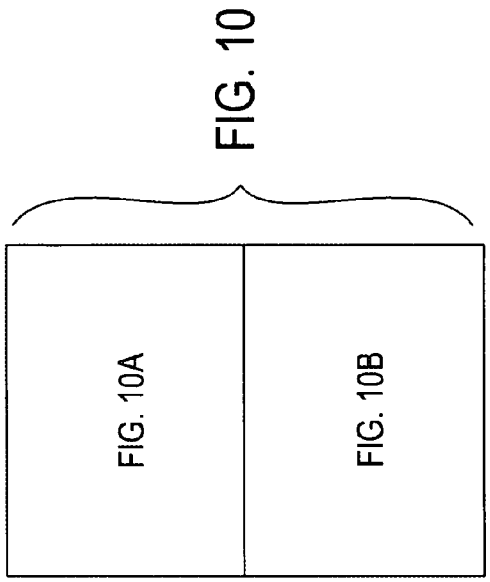
FIG. 10 (composed of FIG. 10A and FIG. 10B) illustrates an embodiment of a translation table of validity date ranges and corresponding query parameters.

Various date ranges may be expected to be employed in different methods and systems. Therefore, a representation of such date ranges may be necessary. FIG. 10 illustrates an embodiment of a translation table of validity date ranges and corresponding query parameters. The translation table may be understood, in one embodiment, as a lookup table, with the parameter used for looking up being the time period listed in the LOW field. In one embodiment, the database parameters (for a select statement or query for example), are the SELFIELD, SIGN, OPTION and LOW fields listed. Such fields may be used as parameters sent as part of a select statement to a database interface for use in selecting records corresponding to a desired date range. The other fields provided for lookup are the sign (inclusive or exclusive) and option (including these dates or excluding these dates), which may be used to indicate what types of searches should be done. Moreover, some searches may be based on receipt of two dates, thus allowing for a more traditional selection of dates, either by way of numeric entry, selection from a graphical calendar or otherwise. However, an application program interface or control module may be expected to use the lookup table to translate whatever date format is received (including the VALIDITY statement) based on the lookup table into the valid_high and valid_low values used in the select statement.

By way of further explanation, the specific example illustrated in FIG. 10 includes the following specific considerations:

The Sign field determines whether the boundary dates are included or excluded from the date range.

The Option field determines the type of comparison, such as equal, not equal, between (for a range), not between (also for a range), greater than, greater than or equal to, less than and less than or equal to for example.

The system date referred to may be a date or date and timecode maintained by the system using the date ranges, as made available to the process or system in question.

Beginning and ending of a week may be defined as the most recent Monday before or on the current day and soonest upcoming Sunday on or after the current day.

Similarly beginning and ending of a month may be defined as the beginning and ending of the month including the current day.

Moreover, beginning and ending of a quarter may be defined as the beginning and ending days of the quarter including the current day, and may further be subdivided into calendar quarters or fiscal quarters for example.

Similarly, beginning and ending of a year may be defined as the beginning and ending of days the year including the current day.

While these considerations are true for the illustration of FIG. 10, and may be true for the illustration of FIG. 11, other definitions may be used in various embodiments or implementations.

Further representations of a set of date ranges may also be useful. FIG. 11 illustrates an alternate embodiment of a translation table of validity date ranges and corresponding query parameters. FIG. 11 provides a set of lookup table entries for which any dates are explicitly specified. The table allows for translation of the user interface information about inclusive or exclusive ranges, and types of searches into a format useful in a select statement. For example, types of searches or options may include searching for records less than or greater than a date, or for records equal to or not equal to a given date. The tables of FIG. 10 and FIG. 11 may be combined into a single lookup table in some embodiments.

While this invention has been described in terms of certain exemplary embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:

1. A machine-readable storage device storing computer-executable instructions to implement an automated method including accessing a validity range table, the method comprising the steps of:

receiving a database selection statement which includes a validity range indicating a time period for which data is desired;

comparing the validity range to the validity range table to select a date range identifier;

determining a begin date and an end date corresponding to the date range identifier based on date information from the validity range table;

based on the begin date and end date, translating the validity range into a validity from parameter and a validity to parameter; and submitting a database query including the validity from parameter and the validity to parameter to a database interface, wherein database records responsive to the database selection statement are determined to be valid for at least one date between the validity from and validity to parameters.

2. The method of claim 1, further comprising:
receiving a set of records from the database interface responsive to the database query.

3. The method of claim 2, further comprising:
transmitting the set of records to a user interface.

4. The method of claim 1, further comprising:
querying a user for the validity range.

5. The method of claim 1, wherein:
the validity range is specified as a fiscal quarter.

6. The method of claim 1, wherein:
the validity range is specified as a week.

7. The method of claim 1, wherein:
receiving the validity range includes receiving a selection from a user of a text representation of a validity range in a user interface.

8. The method of claim 1, wherein:
the method is performed by a processor responsive to a set of instructions, the set of instructions embodied in a machine-readable medium.

9. An apparatus, comprising:
a database interface configured to receive a database query including a validity from parameter and a validity to parameter;
a display device, displaying a user interface configured to receive a database selection statement which includes a validity range that indicates a time period for which data is desired; and
a processor, executing as a validity range interpreter configured to;
comparing the validity range to the validity range table to select a data range identifier;
translate the date range identifier into a validity from parameter and a validity to parameter based on the date range identifier received from a validity range table,
submitting a database query including the validity from parameter and the validity to parameter to the database interface, wherein database records responsive to the database selection statement are determined to be valid for at least one date between the validity from and to parameter.

10. The apparatus of claim 9, wherein:
the user interface includes a drop-down menu.

11. The apparatus of claim 9, wherein:
the validity range table comprises a lookup table having date range identifiers and corresponding date calculations.

12. The apparatus of claim 9, further comprising:
a memory;
a bus coupled to the processor and to the memory;
wherein the processor is to operate the database interface, the user interface and the validity range interpreter.

13. A computer-readable storage device storing computer-executable instruction to implement an automated method comprising the steps of:
receiving a validity statement including a date range and an identifier from a user interface;
determining the identifier indicates a validity range statement;
looking up the date range of the validity statement in a validity range table to select a date range identifier;
determining corresponding to the date range identifier based on date information from the validity range table;
based on information received from the validity range table, translating the determined begin date and the end date of the date range of the validity statement into a validity from parameter and a validity to parameter;
submitting a database select statement including the validity from parameter and the validity to parameter to a database interface;
receiving a set of records from the database interface responsive to the database select statement; and
transmitting the set of records to the user interface.

14. The method of claim 13, wherein:
the date range is a calendar quarter.

15. The method of claim 13, wherein:
the date range is a fiscal quarter.

16. The method of claim 13, further comprising:
translation includes performing calculations from the validity range table on a current date to determine the validity from parameter and the validity to parameter.

17. A computer-implemented method of converting a first expression of date information to a second expression of date information, comprising:
responsive to a search request that includes date information expressed as a validity range having a first level of precision, comparing, by a processor, the validity range to a plurality of range identifiers stored in a validity range table maintained in a data storage device;
when the validity range matches a range identifier in the validity range table, retrieving, by the processor, a begin date and an end date from a matching entry of the validity range table, the begin date and end date having a second level of precision more detailed than the first level of precision;
based on the begin date and end date, translating the validity range into a validity from parameter and a validity to parameter; and
searching, by the processor, a database using the validity from parameter, the validity to parameter and other search criteria from the search request.

18. The method of claim 17, wherein the validity range expresses date information at a level of precision corresponding to a calendar week and the begin date and the end date expresses date information at a level of precision corresponding to a calendar day.

19. The method of claim 17, wherein the validity range expresses date information at a level of precision corresponding to a calendar month and the begin date and the end date expresses date information at a level of precision corresponding to a calendar day.

20. The method of claim 17, wherein the validity range expresses date information at a level of precision corresponding to a calendar quarter and the begin date and the end date expresses date information at a level of precision corresponding to a calendar day.

* * * * *